J. VAN NORMAN.
Forcing Liquids.
No. 113,115.           Patented March 28, 1871.
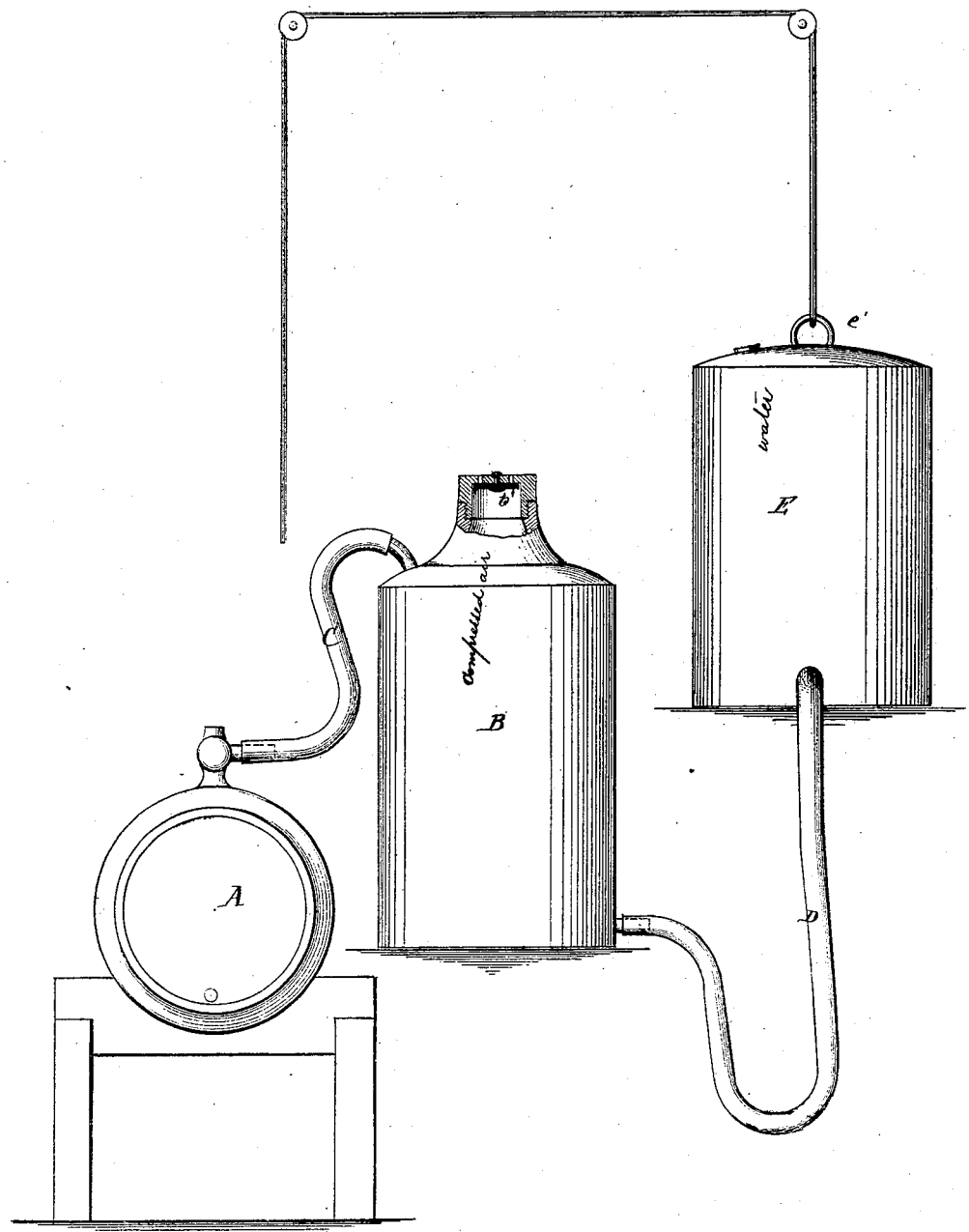
Witnesses:
A. W. Almqvist
Wm. H. C. Smith
Inventor:
Jacob Van Norman
Per Munn/Co
Attorneys.

United States Patent Office.

JACOB VAN NORMAN, OF EASTON, PENNSYLVANIA.

Letters Patent No. 113,115, dated March 28, 1871.

IMPROVEMENT IN FORCING LIQUIDS.

The Schedule referred to in these Letters Patent and making part of the same.

*To all whom it may concern:*

Be it known that I, JACOB VAN NORMAN, of Easton, in the county of Northampton and State of Pennsylvania, have invented a new and useful Improvement in Apparatus for Drawing Beer, &c.; and I do hereby declare that the following is a full, clear, and exact description thereof, which will enable others skilled in the art to make and use the same, reference being had to the accompanying drawing forming part of this specification, in which—

The figure is a side view of my improved apparatus, part being broken away to show the construction.

My invention has for its object to furnish an improved apparatus, simple in construction, convenient in use, and effective in operation, by means of which hydraulic pressure may be employed to force air automatically into the cask to take the place of the beer as it is withdrawn from said cask, so that the last beer drawn from the cask may be as good as the first, and which may be applied to other uses; and It consists in the construction and combination of the various parts of the apparatus, as hereinafter more fully described.

A represents a cask containing beer.

B is a tank or vessel containing air, placed in some convenient position near the cask A, and either above, below, or upon a level with the said cask, as may be desired.

C is a tube, one end of which is connected with the bung-hole of the cask A by a stop-cock or other suitable connection.

The other end of the tube C is connected with the upper part of the air-tank B.

In the top of the air-tank B is formed a hole or holes, closed with a valve, $b'$, opening inward, so that, when the air within said tank is under pressure, the valve $b'$ may remain tightly closed; but when the pressure is removed the said valve may open and allow the air to pass into the tank freely.

D is a tube, one end of which is connected with the lower part of the air-tank B, and the other end of which is connected with the lower part of the tank E.

The tank E is designed to contain water or other suitable liquid, and has a small hole or opening in its top, through which the liquid may be introduced, and which will allow the air to pass in and out freely.

To the top of the tank E is attached a bail, loop, or eye, $e'$, to receive the end of a rope or chain, by which the said tank E is suspended, and by which the said tank may be raised and lowered, the tank being so arranged that it may be raised above and lowered below the air-tank B.

In using the apparatus the tube C is connected with the cask A, from which the beer is to be drawn, the tank B being filled with air and the tank E with water or other suitable liquid. The tank E is then raised above the air-tank B, so that, as the beer is drawn from the cask A, the liquid from the tank E will flow, through the tube D, into the air-tank B, and force air from said tank, through the tube C, into the cask A, to take the place of the withdrawn beer, so as to keep the beer in the said cask always under an air-pressure to keep the carbonic-acid gas from separating from said beer and thus spoiling it.

When the beer has all been drawn from the cask A the liquid-tank E is lowered below the air-tank B, which allows the liquid in the air-tank B to flow back, through the tube D, into the tank E, air passing into the tank B to take the place of the water as it flows out.

While the water is flowing back through the tube D into the tank E, the empty cask A may be detached from the tube C, and replaced with a full cask, so that, as soon as the water has all passed back into the tank E the said tank may be again raised, putting the beer in the cask A under the air-pressure.

The air-pressure thus produced may be employed for driving a small engine or other desired purpose.

Having thus described my invention,

I claim as new and desire to secure by Letters Patent—

The combination of the air-tank B $b'$, tubes C and D, and movable liquid-tank E with each other, substantially as herein shown and described, to apply an air-pressure to a cask of beer or other desired object, as set forth.

JACOB VAN NORMAN.

Witnesses:
 BEATY R. SWIFT,
 GEORGE SHELLEY.